United States Patent [19]

Kress

[11] Patent Number: 4,940,735
[45] Date of Patent: Jul. 10, 1990

[54] BLOWING AGENT MASTERBATCH FOR THE PREPARATION OF POLYSTYRENE FOAMS

[75] Inventor: Gerhard Kress, Ludwigshafen, Fed. Rep. of Germany

[73] Assignee: BASF Aktiengesellschaft, Ludwigshafen, Fed. Rep. of Germany

[21] Appl. No.: 327,928

[22] Filed: Mar. 23, 1989

[30] Foreign Application Priority Data

Mar. 26, 1988 [DE] Fed. Rep. of Germany ....... 3810342

[51] Int. Cl.$^5$ ............................................... C08J 9/08
[52] U.S. Cl. .................................. 521/86; 521/88; 521/92; 521/96; 521/97; 521/98; 521/146
[58] Field of Search .................. 521/96, 98, 146, 92, 521/97, 86, 88

[56] References Cited

U.S. PATENT DOCUMENTS 4,632,942 12/1986 Ito et al. ................................ 521/92

FOREIGN PATENT DOCUMENTS 1504711 11/1969 Fed. Rep. of Germany.
8606328 11/1986 World Int. Prop. O..

OTHER PUBLICATIONS

Chem. Abstracts CA 107 135564k=JP-A-62 70 429 Dainichiseika.
Chem. Abstracts CA 82 141140a=JP-A-74 107 370 Mitsubishi.

*Primary Examiner*—Morton Foelak
*Attorney, Agent, or Firm*—William G. Conger

[57] ABSTRACT

The present invention deals with a novel blowing agent masterbatch for the preparation of polystyrene foams, comprising:
(a) 30 to 80 weight percent of a plasticizer-containing polystyrene having a Vicat softening temperature between 30° and 50° C.;
(b) 20 to 70 weight percent of blowing agent based on solid organic acids and alkali metal (bi) carbonates; and optionally
(c) 10 to 20 weight percent of cell regulators.

3 Claims, No Drawings

BLOWING AGENT MASTERBATCH FOR THE PREPARATION OF POLYSTYRENE FOAMS

Background of the Invention

1. Field of the Invention

The subject invention pertains to the preparation of polystyrene foams. More particularly, the subject invention pertains to the use of certain blowing agent master batches for the preparation of polystyrene foams.

2. Description of the Related Art

In the preparation of fine cell polystyrene foams, particularly those in the form of films, a mixture of solid organic acids and alkali metal (bi) carbonates, which under processing conditions release carbon dioxide, may be used as a blowing agent. However, the homogeneous mixing of the blowing agent into the polystyrene melt causes considerable difficulties.

Numerous experiments have been aimed at first preparing a premixture (masterbatch) of thermoplastic and blowing agent in which the blowing agent is uniformly distributed, and subsequently this premixture is added to polystyrene which is then extruded into foam. In addition, it has been shown that it is not possible to mix polystyrene with such blowing agent without premature foaming, since the blowing agent decomposes at the melt temperature of the polystyrene. If another low melting point thermoplastic is used in place of polystyrene as the base material of the blowing agent masterbatch, then homogeneous foams cannot be prepared due to insufficient compatibility of such thermoplastics with polystyrene.

Description of the Preferred Embodiments

Thus, the object of the present invention was to develop a masterbatch for the preparation of polystyrene foams which contains a blowing agent based on solid organic acids and alkali metal (bi) carbonates, which can be prepared without decomposing the blowing agent and whose base polymer is compatible with polystyrene. These and other objects are met by using a plasticizer-containing polystyrene having a Vicat softening temperature between 30° and 50° C.

Accordingly, the object of the present invention is a blowing agent masterbatch for the preparation of polystyrene foams, comprising:

(a) from 30 to about 80 weight percent of plasticizer-containing polystyrene having a Vicat softening temperature between 30° and 50° C.;

(b) from 20 to about 70 weight percent of blowing agent based on solid organic acids and alkali metal (bi) carbonates; and optionally (c) from 10 to about 20 weight percent of a cell regulator.

Using the novel blowing agent masterbatch of the subject invention offers a number of advantages in the preparation of foam: the masterbatch allows for easy mixing with the polystyrene even with a slowly rotating mixer; and it allows for direct addition into the extruder using conventional proportioning equipment. The material is very homogeneously distributed in the polystyrene as reflected by a highly uniform cell structure. In addition, incrustations in the proportioning cylinder and on the worm gear of the extruder are prevented and in turn, shut down times are reduced and extruder operating times increased.

An essential component of the masterbatch is a plasticizer-containing polystyrene having Vicat softening temperature (DIN 53 460, VST A) between 30° C. and 50° C. All commercially available styrene polymers can be used as the polystyrene compound, such as styrene homopolymers and copolymers which contain at least 50 weight percent of styrene polymerized in situ. Impact resistant polystyrene with rubber particles is also useful. It is essential that the Vicat softening temperature of the polystyrene be lowered to from 30° to 50° C. by adding a conventional plasticizer such as paraffin oil, silicone oil, medium to long chain alkyl esters of phthalic acid or isophthalic acid, or polypropylene oxide. The optimum plasticizer quantity generally lies in a range between 20 and 100, more preferably, between 30 and 85 weight percent based on the polystyrene and can be easily determined by simple screening experiments. The masterbatch contains 30 to 80 weight percent, more preferably, 40 to 70 weight percent of the plasticizer-containing polystyrene.

As the blowing agent is used a mixture of one or more solid organic acids, for example oxalic acid, succinic acid, adipic acid, phthalic acid, and preferably citric acid; and an alkali metal carbonate or alkali metal bicarbonate, for example, sodium carbonate, potassium carbonate, and preferably, sodium bicarbonate. The acid and carbonate and/or bicarbonate are generally used in approximate stochiometric quantities, i.e. about 0.9 to 1.1 alkali equivalents per acid equivalent. The batch contains 20 to 70 weight percent of blowing agent, more preferably, 30 to 60 weight percent.

In addition, the masterbatch may contain 10 to 20 weight percent of conventional cell regulators such as talc, kaolin, silica gel and the like. Optionally, other additives can be added to the masterbatch such as dyes, pigments, lubricants, flame retardants, and antistatic agents, all in conventional quantities.

The preparation of the masterbatch occurs by homogeneous mixing of the components in the melt of the polystyrene in conventional mixing equipment, for example in an extruder, and by reducing the mixture in size, for example by means of hot die face cutting of the extruded material followed by cooling. In order to avoid decomposition of the blowing agent, it is recommended that when mixing the components, the temperature remains below the decomposition temperature of the blowing agent which is generally at temperatures below 125° C.

The blowing agent masterbatch is used in the preparation of polystyrene foams according to processes such as for example disclosed in U.S. Pat. No. 2,941,946.

The parts cited in the Examples refer to parts by weight.

Example 1

The following were continuously fed into an extruder 42 parts of standard polystyrene (viscosity number 74, Vicat softening temperature according to DIN 53 460, VST A, 84° C.);

18 parts of paraffin oil as a plasticizer;
20 parts of citric acid; and
20 parts of sodium bicarbonate.

The mixture was melted and homogenized at a temperature of 110° to 135° C. and subsequently extruded, cut into a granulate by hot die face cutting, and immediately cooled and dried. The Vicat softening temperature of the plasticizer-containing polystyrene was 34° C. (DIN 53 460, VST A).

The granulate was practically pore free.

Example 2

Example 1 was followed, however the following mixture was used: 20 parts of standard polystyrene (Viscosity Number 74 Vicat temperature according to DIN 53 460 VST A, 84° C.);

20 parts of paraffin oil as a plasticizer;
20 parts of citric acid;
20 parts of sodium bicarbonate; and
20 parts of talc as a cell regulator.

The Vicat softening temperature of the plasticizer-containing polystyrene was 30° C. The granulate was practically pore free.

I claim:

1. A blowing agent masterbatch for the preparation of polystyrene foams, comprising:

(a) from 30 to about 80 weight percent of a plasticizer-containing polystyrene having a Vicat softening temperature between 30° and 50° C.;
   (b) from 20 to about 70 weight percent of a blowing agent comprising solid organic acids and alkali metal (bi) carbonates; and optionally
   (c) from 10 to about 20 weight percent of a cell regulator.

2. The blowing agent masterbatch of claim 1 wherein said plasticizer is selected from the group consisting of the paraffin oils, the silicone oils, the medium to long chain alkyl phthalates and isophthalates, the polypropylene oxides, and mixtures thereof.

3. The blowing agent masterbatch of claim 1 wherein said alkali metal (bi) carbonate is selected from the group consisting of sodium carbonate, potassium carbonate, sodium bicarbonate, and mixtures thereof.

* * * * *